(12) United States Patent
Quinn

(10) Patent No.: US 6,594,582 B1
(45) Date of Patent: Jul. 15, 2003

(54) GPS COMPOUND EYE ATTITUDE AND NAVIGATION SENSOR AND METHOD

(75) Inventor: David A. Quinn, Ellicott City, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/574,986

(22) Filed: May 12, 2000

Related U.S. Application Data
(60) Provisional application No. 60/134,260, filed on May 14, 1999.

(51) Int. Cl.[7] .............................................. H04B 7/185
(52) U.S. Cl. ........................ 701/213; 701/215; 701/13; 701/4; 342/357.11; 342/357.12; 343/878
(58) Field of Search ................................. 701/213, 215, 701/13, 4; 342/357.12, 357.11; 343/DIG. 2, 878, 897

(56) References Cited

U.S. PATENT DOCUMENTS

| | | | | |
|---|---|---|---|---|
| 4,020,702 A | * | 5/1977 | Epstein ......................... 74/5.34 |
| 4,578,920 A | * | 4/1986 | Bush et al. .................... 52/645 |
| 4,811,034 A | * | 3/1989 | Kaminskas ................. 343/915 |
| 5,377,166 A | * | 12/1994 | Kuhn .......................... 367/138 |
| 5,642,122 A | * | 6/1997 | Lockie et al. ............... 343/881 |
| 5,736,959 A | * | 4/1998 | Patterson et al. ........... 342/354 |
| 5,831,572 A | * | 11/1998 | Damilano .................... 342/352 |
| 6,002,360 A | * | 12/1999 | Wolcott et al. ............. 342/354 |
| 6,005,514 A | * | 12/1999 | Lightsey ...................... 342/365 |
| 6,018,315 A | * | 1/2000 | Ince et al. ............. 342/357.11 |

OTHER PUBLICATIONS

Bondyopadhyay, "Geodesic sphere phased arrays for LEO satellite communications", Antennas and Propagation Society International Symposium, 2000, IEEE vol. 1, pp. 206–209, 2000.*

Brandwood, "Phase steering for modified dodecahedral array for mobile satcoms", IEEE Colloquium on Electronic Beam Steering, pp. 6/1–6/6, ref. No. 1998/481, 1998.*

Tumer et al., "All-sky X-ray and gamma-ray monitor (AXGAM)", Nuclear Science Symposium, 1996.*

* cited by examiner

Primary Examiner—Michael J. Zanelli
Assistant Examiner—Eric M Gibson
(74) Attorney, Agent, or Firm—Keith Dixon

(57) ABSTRACT

The present invention is a GPS system for navigation and attitude determination, comprising a sensor array including a convex hemispherical mounting structure having a plurality of mounting surfaces, and a plurality of antennas mounted to the mounting surfaces for receiving signals from space vehicles of a GPS constellation. The present invention also includes a receiver for collecting the signals and making navigation and attitude determinations. In an alternate embodiment the present invention may include two opposing convex hemispherical mounting structures, each of the mounting structures having a plurality of mounting surfaces, and a plurality of antennas mounted to the mounting surfaces.

9 Claims, 11 Drawing Sheets

Hemi-dodecahedron

Hemi-dodecahedron

Hemi-Buckeyball

Opposing Hemi-Buckeyballs

GPS COMPOUND EYE ATTITUDE AND NAVIGATION SENSOR AND METHOD

This application claims benefit of priority under 35 U.S.C. §119(e) to Provisional Application Serial No. 60/134,260 filed May 14, 1999.

ORIGIN OF INVENTION

The invention described herein was made by an employee of the United States Government, and may be manufactured and used by or for the Government for governmental purposes without the payment of any royalties thereon or therefor.

TECHNICAL FIELD

The present invention relates to a sensor and method for determining the attitude of vehicles, including aircraft and spacecraft, using the Global Positioning System (GPS).

BACKGROUND ART

The Global Positioning System (GPS) constellation was originally developed to give a wide variety of user vehicles an accurate means of determining position for autonomous navigation. The constellation includes 24 space vehicles (SVs) in semi-synchronous (12 hour) orbits, providing a minimum of six SVs in view for ground-based navigation. The underlying principle involves geometric triangulation with the GPS SVs as known reference points to determine the user's position to a high degree of accuracy. The GPS was originally intended for ground-based and aviation applications, gaining much attention in the commercial community (e.g., automobile navigation, aircraft landing, etc.). However, in recent years there has been a growing interest in space-based applications. Since the GPS SVs are in approximately 20,000 km circular orbits, the position of any potential user below the constellation may be easily determined. A minimum of four SVs are required so that in addition to the three-dimensional position of the user, the time of the solution can be determined and in turn employed to correct the user's clock.

Since its original inception, there have been many innovative improvements to the accuracy of the GPS determined position. These include using local area as well as wide area differential GPS, so-called "pseudolites" (ground-based GPS transmitters), and carrier-phase differential GPS. In particular, carrier-phase differential GPS measures the phase of the GPS carrier relative to the phase at a reference site, which dramatically improves the position accuracy. Also, for spacecraft applications dynamically aided GPS using orbit models with GPS measurements in an extended Kalman filter can improve position accuracy.

Early applications of this concept to user spacecraft in Low Earth Orbits (LEOs) have demonstrated extremely useful results. Recently, there have been investigations of position determination by user spacecraft from above the GPS constellation. However, since current GPS SVs transmit their signals towards the Earth, this concept poses a much more difficult problem because the user spacecraft must rely on "spillage" signals received from GPS SVs on the far side of the Earth.

Another aspect of space-based applications using GPS that has gained much recent attention is attitude determination. One of the first space-based applications was flown on the RADCAL (RADar CALibration) spacecraft, which demonstrated a GPS attitude determination capability using post-processed measurements. To obtain maximum GPS visibility, and to reduce signal interference due to multipath reflection, GPS patch antennas were placed on the top surface of the spacecraft bus. Although the antenna baselines were relatively short for attitude determination (0.67 meter separation), attitude accuracy on the order of 2 degrees per axis ($3\sigma$) was achieved. Another experiment, Crista-SPAS provided the first on-orbit demonstration of real-time attitude determination. The spacecraft contained an accurate gyro reference, but the coordinate frame alignment was not measured relative to the GPS attitude reference frame, which means that discrepancies between the two reference frames might account for slightly different measurements from the two systems. Over the course of the experiment, the two sets of attitude solutions agreed to within 2 degrees, which was thought to be within the alignment tolerance of the two reference frames. The first extended real-time GPS based attitude determination mission was flown on the REX-II spacecraft, which tested actual attitude control using GPS attitude measurements.

The differential carrier-phase measurement error has a standard deviation of about 10 degrees, a small fraction of the standard wavelength. However, many error sources can significantly contribute to attitude inaccuracy. These include: reflections of the GPS carrier from the environment surrounding the antennas (multipath), electrical dissipation inherent when passing carrier-phase signals over the lengths of the RF cables between antennas and receiver (line bias errors), antenna motions due to external disturbances (e.g., thermal distortion effects), constellation availability, tropospheric refraction, and cross-talk errors. The most significant error source and the most difficult to overcome is multipath. In fact, multipath effects can be so pronounced as to be a major driver for the location of the GPS antennas on a vehicle. Despite limited successes with recent attempts at modeling multipath, this error remains a limiting factor in the performance of carrier-phase based GPS attitude determination. This is due to the complex physical nature of the reflecting surfaces, which depends mostly on antenna locations. Line biases can also adversely affect carrier-phase based attitude. These biases are typically determined by performing extensive calibrations (self survey) of the flight system on the ground prior to launch. However, since the space environment can significantly alter the physical properties of the cable through large temperature gradients, a permanent solution to this problem remains elusive. Yet another error source for the carrier-phase based method involves shifting baselines. In general, the attainable attitude accuracy improves with longer baselines. If, however, satisfactorily separating the GPS antennas requires mounting them on flexible structures (such as solar arrays, or deployable booms), then the attitude performance of the carrier-phase based method can be seriously compromised to the point where the advantages of the longer baseline is compromised. It is important to recognize that the aforementioned errors are primarily a result of the physical problems associated with using carrier-phase based measurements for attitude determination.

Before the actual GPS attitude determination can be performed, the correct number of integer wavelengths between each pair of antennas must be found. The resolution of these integer ambiguities has been extensively investigated. Such integer resolution techniques fall into two general categories: instantaneous and motion-based techniques. Instantaneous techniques provide immediate integer resolution without vehicle motion; however, the uniqueness of the solution may be severely degraded with sensor noise.

Motion-based techniques use a batch of data to determine the integers; however, they rely on sufficient vehicle motion to obtain system observability. In either case, it is essential that these integers are accurately resolved before attitude determination can occur.

STATEMENT OF INVENTION

In accordance with the present invention, a GPS system for navigation and attitude determination is provided, comprising a sensor array including a convex hemispherical mounting structure having a plurality of mounting surfaces, and a plurality of antennas mounted to said mounting surfaces for receiving signals from space vehicles of a GPS constellation; and a receiver for collecting said signals and computing said navigation and attitude determination.

In accordance with another aspect of the present invention, a GPS sensor for navigation and attitude determination is provided, comprising two opposing convex hemispherical mounting structures, each of said mounting structures having a plurality of mounting surfaces, and a plurality of antennas mounted to said mounting surfaces.

In accordance with another aspect of the present invention, a GPS sensor array for navigation and attitude determination is provided, comprising a convex hemispherical mounting structure having a plurality of antenna mounting surfaces, said convex hemispherical mounting structure; and a plurality of antenna elements, each mounted to one of said mounting surfaces of said hemispherical mounting structure, wherein each of said plurality of antenna elements has a restricted field-of-view, said restricted field-of-views being oriented in a predetermined configuration to maximize the accuracy of said navigation and attitude determination.

In accordance with another aspect of the present invention, a method of determining the attitude of a vehicle is provided, comprising receiving a plurality of GPS carrier signals from a plurality of GPS space vehicles into a sensor array having a plurality of antenna elements, each having a restricted field-of-view; and polling each antenna element of said sensor array to determine which of said GPS space vehicles are within said restricted field-of-view of each antenna element; and constructing and minimizing a loss function to determine said attitude.

In accordance with another aspect of the present invention, a method of determining the navigation and attitude of a vehicle is provided, comprising receiving a plurality of GPS carrier signals from a plurality of GPS space vehicles using a sensor array having a plurality of antenna elements, each having a restricted field-of-view; and computing a navigation and attitude by determining which of said space vehicles is within said restricted field-of-view of each of said antenna elements.

In accordance with another aspect of the present invention, a method of determining the navigation and attitude of a vehicle using a plurality of GPS carrier signals from a plurality of GPS space vehicles collected by a sensor array having a plurality of antenna elements, each having a restricted field-of-view is provided, comprising determining which of said GPS spacecraft are within said restricted field-of-views; forming sightline vectors and determining optimal weighting using area formulas; determining said attitude by minimizing a loss function; mapping said sightline vectors into a body frame; determining an angle between said mapped sightline vectors and said boresights; determining whether each said mapped sightline vector is outside of its corresponding restricted field-of-view; and repeating the recited steps until each of said mapped sightline vectors is within its corresponding restricted field-of-view.

This new approach involves using an array of GPS antenna positioned to provide maximum sky coverage. This array is used only to find which GPS spacecraft are within the field-of-view (FOV) of each antenna. Attitude determination is performed by considering the sightline vectors of the found GPS spacecraft together with the boresight vector of the particular antenna, unlike interferometric methods. The boresight is used since the exact location of the GPS spacecraft in the body-frame of the antenna FOV is not known. The approach is similar to a star tracker, with the GPS sightline vectors as the inertial reference vectors and the antenna boresight vectors as the body vectors. Multiple antennas are used to increase attitude accuracy.

The advantages of the new sensor approach include: 1) differential carrier-phase measurements are not required, 2) attitude errors from multipath can be reduced or even eliminated, 3) integer ambiguities do not need to be resolved, and 4) line biases do not need to be determined. Therefore, the new sensor approach is easy to implement and use for any application. It will be shown that the accuracy of the new sensor is better as the FOV decreases.

Multiple sensor configurations were tested to investigate this phenomenon. Accuracies were obtained that prove that the CEGANS concept can meet the attitude requirements of a wide variety of vehicles. In addition, as technology evolves and GPS receivers and antennas become more and more capable, this method can be further refined by better processing schemes and an increase in the number of antenna elements. This potential is in stark contrast to the potential for growth inherent in differential or carrier-phased base methods of comparable capability, which are asymptotically approaching the limits imposed by physics.

DETAILED DESCRIPTION OF THE INVENTION

When considering GPS for navigation uses, it is advantageous for a single antenna to cover as much of the visible sky as possible, allowing signals from as many GPS SVs 26 to be processed as are available to the user. In this way, the best possible navigation solution can be ascertained with the minimum amount of spacecraft hardware. The natural result of this approach has been the development of patch antennas capable of tracking GPS SVs over a hemispherical FOV.

An ideal solution is to provide an attitude capability without losing the navigation function, while simultaneously avoiding the constraints and requirements imposed by the interferometric method discussed above. This is an approachable goal once a new and different method of employing GPS patch antennas is considered. While most antenna designs tend to maximize the available FOV to a given antenna for navigation and attitude determination purposes, a different approach is introduced in the present invention that uses a reduced FOV.

Using multiple antennas distributed over the surface of a hemisphere, and restricting the FOV of each antenna to a predetermined cone can provide a workable solution. In this way, each antenna functions as a star tracker, whose "stars" are the GPS SVs themselves. Two such arrays of restricted FOV antennas still allow full sky coverage of the GPS constellation (not shown) thereby permitting navigation solutions to be determined at any attitude. Since the nominal GPS navigation solution fixes the positions of the GPS SVs as well as the user vehicle in time and space, the sightline 28 from the user to the GPS constellation may also be determined. If each antenna can be "polled" to determine which GPS SVs are visible in each restricted FOV at a given time, information about where the known sightlines are relative to the antenna array is also possible. Finally, fixing the antenna geometry relative to the vehicle body frame allows vehicle attitude information to be determined from the orientation of multiple sightlines in the restricted FOVs of the antenna array.

A description will now be given of the GPS-based attitude sensors and method of the present invention, with reference to drawings.

Figure 1A:
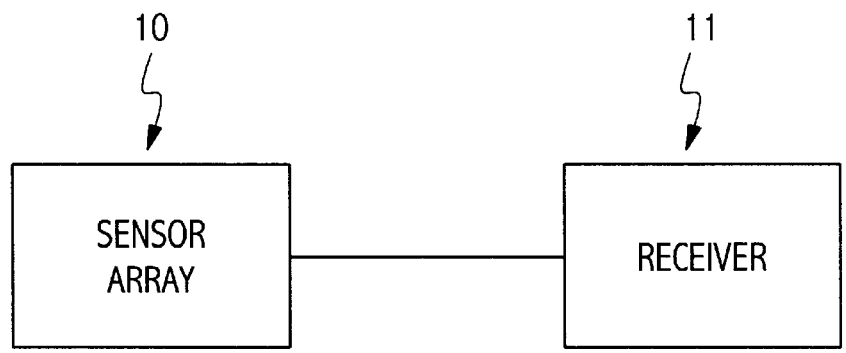
FIG. 1A is a block diagram of the antenna array and receiver of the invention.

A block diagram of the basic elements of the present invention, a sensor array 10 and a receiver 11, are shown in FIG. 1A. Receiver 11 may be, for example, a hardware logic implementation of the attitude determination method discussed herein. Receiver 11 may also, for example, be a software implementation of the method for use with a general purpose computer.

Figure 1B:
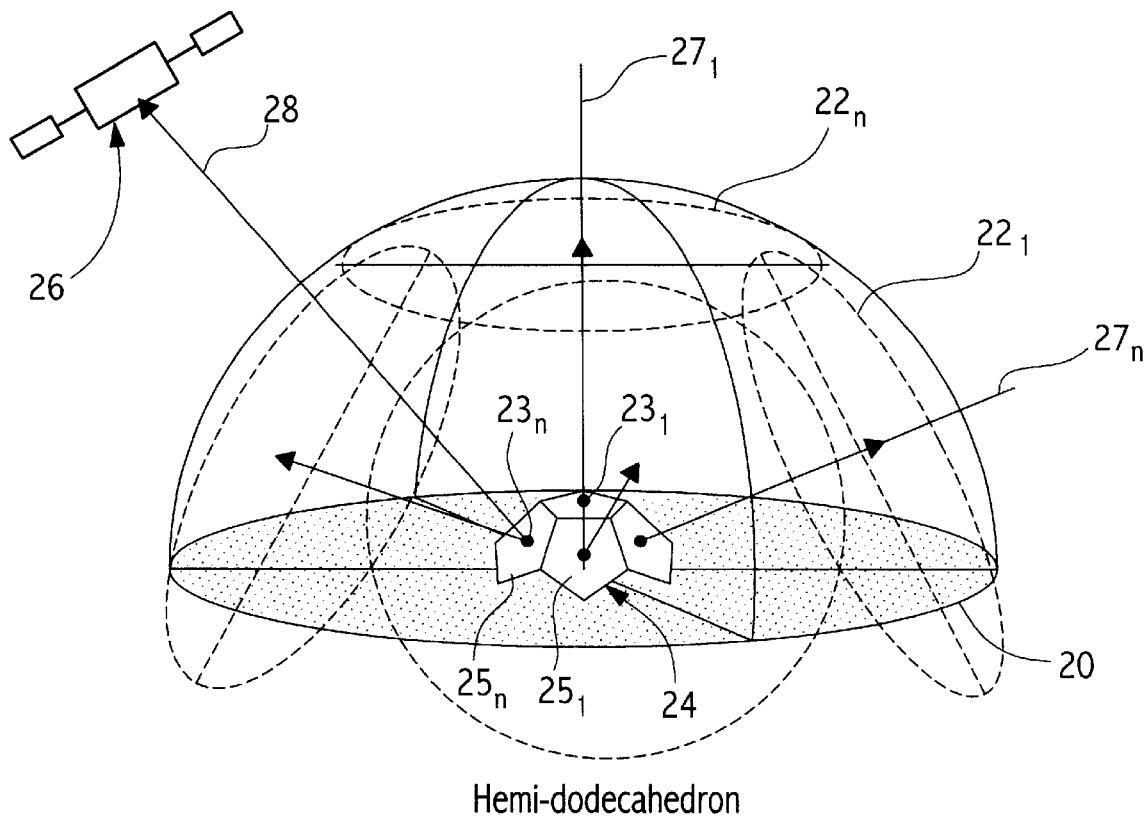
FIG. 1B is a 6-faced hemi-dodecahedron sensor according to a first embodiment of the invention.

According to a first embodiment of the present invention, a six-element sensor array 10 is employed. As shown in FIG. 1B, each antenna or antenna element $23_1$–$23_n$ is mounted to one face or mounting surface $25_1$–$25_n$ of a convex hemispherical mounting structure (buckeyball) 24, in this case a hemi-dodecahedron. This configuration allows one reference antenna 23 to be oriented parallel to the sensor mounting plane 20, while maintaining a uniform separation between all adjacent antennas. The half-cone angle for each antenna $23_1$–$23_n$ may be no less than 37.48 degrees. With a half-cone angle of 37.48 degrees the sky is effectively divide into six overlapping FOVs $22_1$–$22_n$, entirely covering half the sky while avoiding regions simultaneously observable by three antenna elements.

Figure 2:
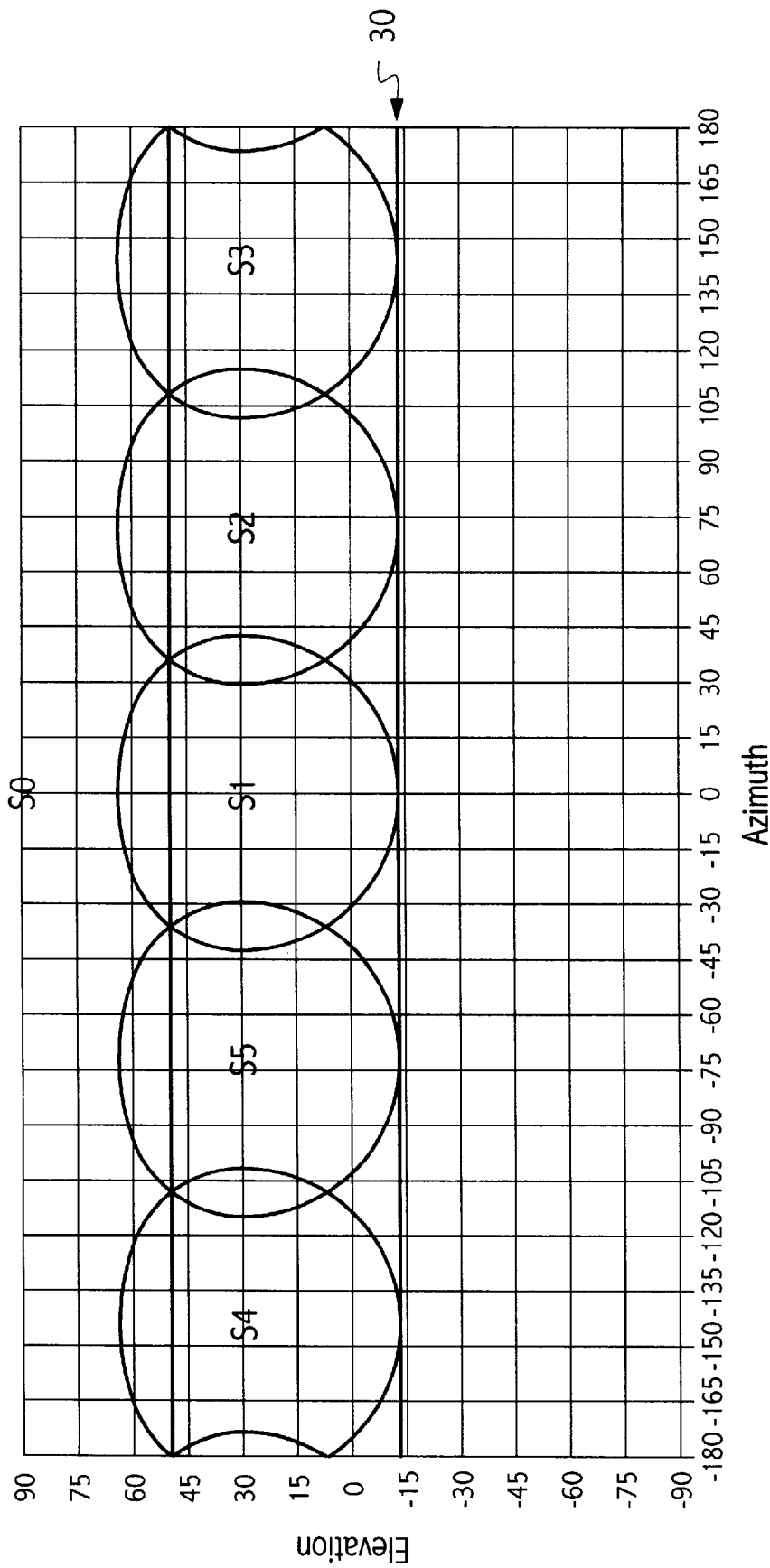
FIG. 2 is a 2-D projection of the field-of-view of the sensor of a first embodiment of the invention.

For the sake of simplicity, the present invention is assumed to be mounted to a LEO spacecraft (not shown) which is located directly over the north pole of the Earth, and oriented with a zero degree offset in both azimuth and elevation with respect to the inertial frame (zero degree attitude error). The present invention has a representative scattering of GPS SVs 26 in inertial space. A planar projection of the present invention's FOV is shown in FIG. 2, where the antenna element centers are labeled as S0 through S5 and the GPS SVs are labeled as N01 through N31. In this projection, line 30 represents the Earth limb, below which GPS SVs are eclipsed and may not be employed in subsequent calculations.

Figure 3A:
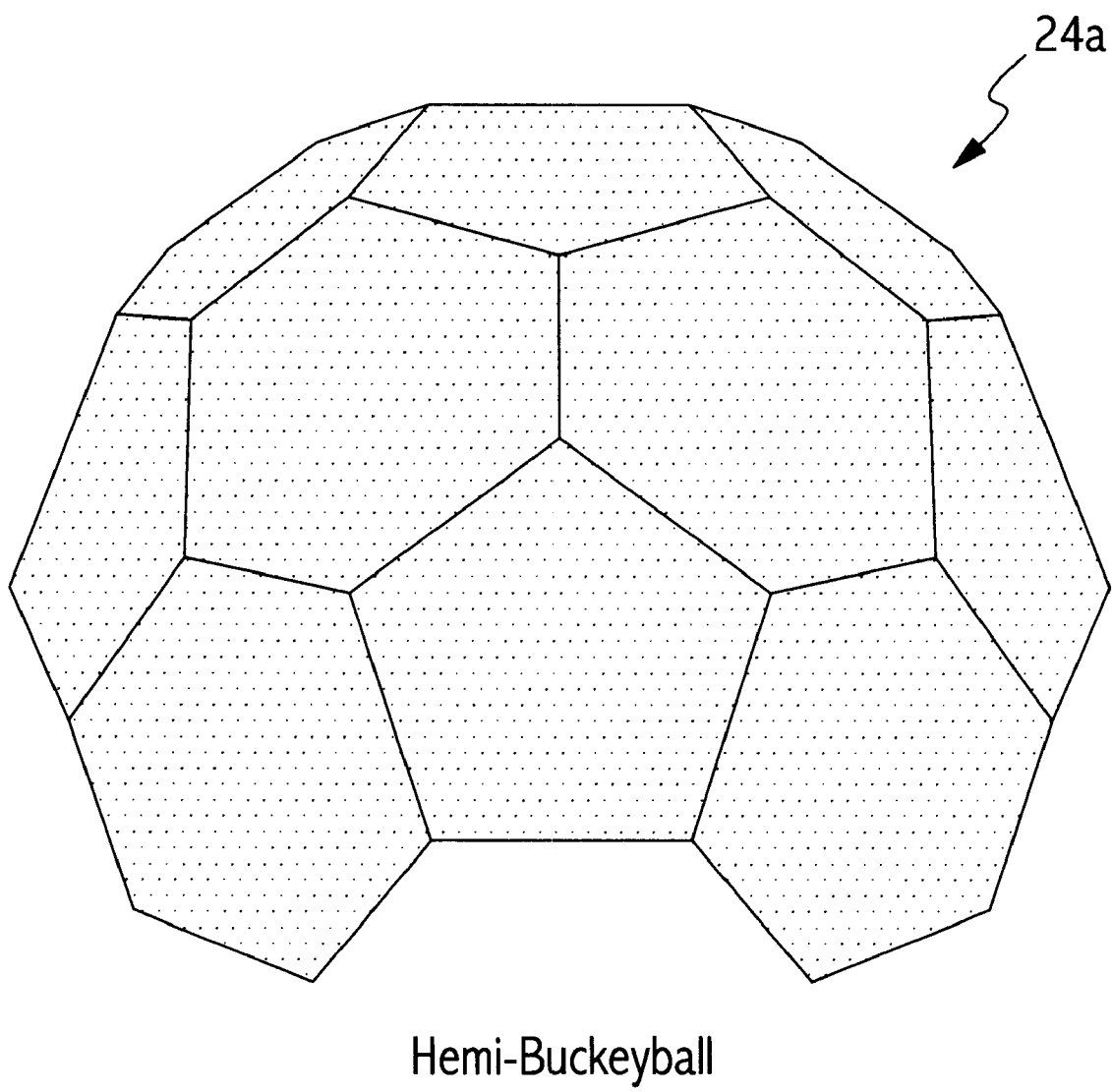
FIG. 3A is a 16-faced hemi-buckeyball sensor according to a second embodiment of the invention.
Figure 3B:
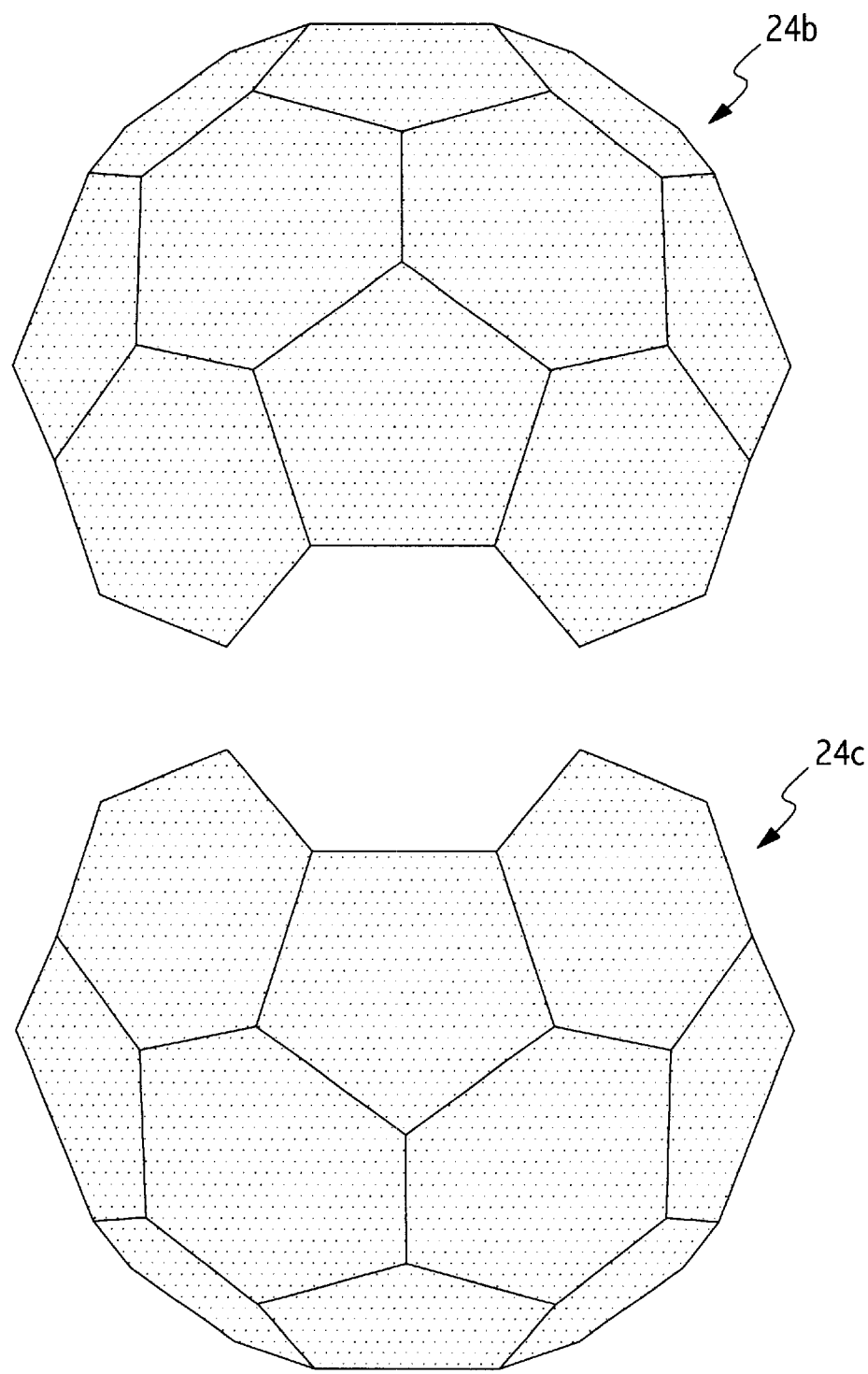
FIG. 3B are two hemi-buckeyballs oriented in opposite directions according to a third embodiment of the invention.
Figure 4:
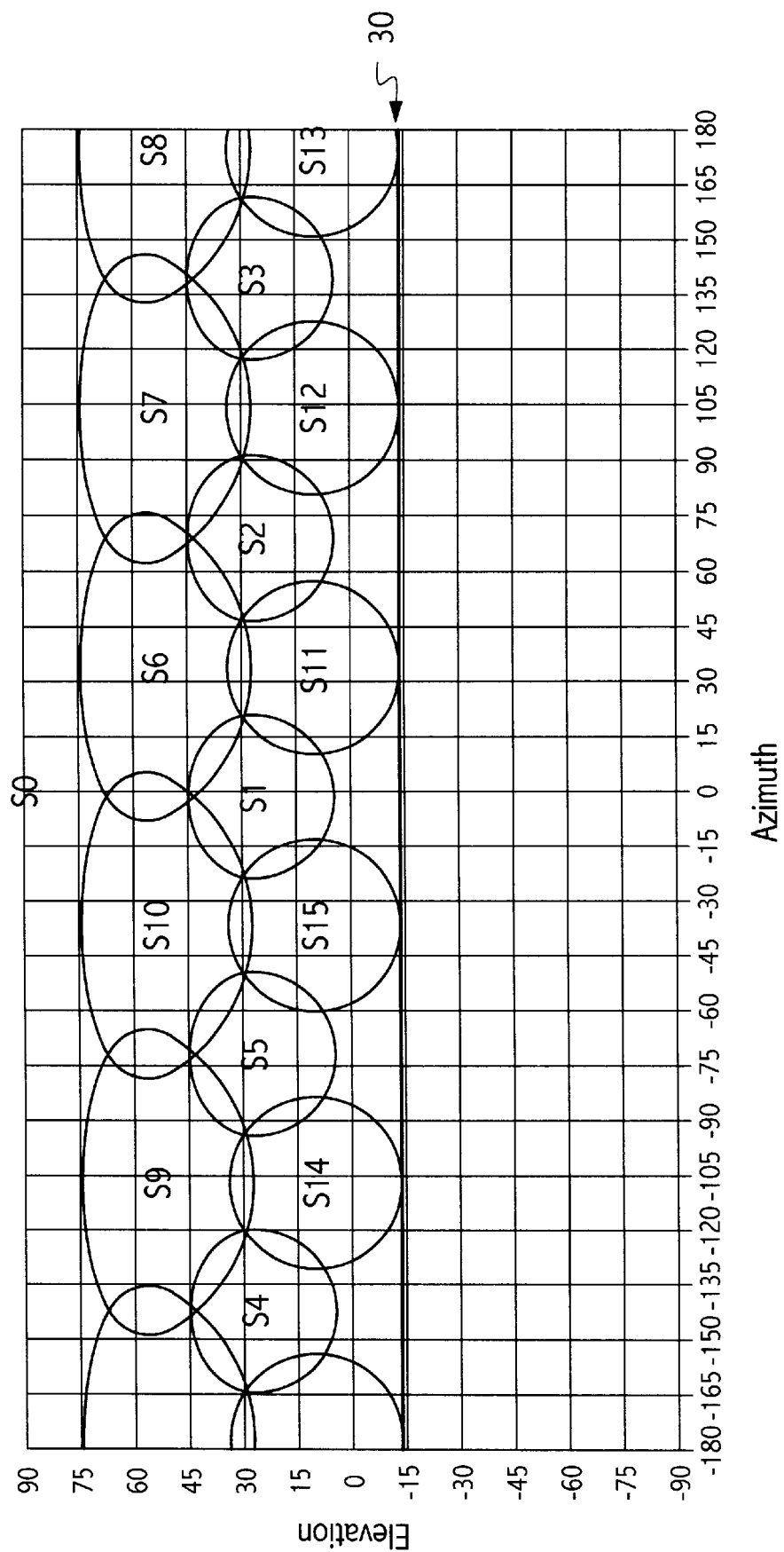
FIG. 4 is a 2-D projection of the field-of-view of the sensor of a second embodiment of the invention.

Spherical symmetry makes buckeyball 24 a very attractive geometry. A buckeyball is a solid which may be viewed as a combination of two regular solids, the dodecahedron and the icosohedron. A three dimensional fusion of the two solids renders a solid with 32 faces, 12 identical pentagons (half-cone angle of 20.07 degrees) regularly arranged as on a dodecahedron and 20 identical hexagons (half-cone angle of 23.8 degrees) arranged as are the triangles of an icosohedron. In addition, a 16-faced hemi-buckeyball 24a may be employed, as shown in FIG. 3, again with all the half-cone angles set to avoid regions simultaneously observable by three elements. The vehicle model was again assumed to be a LEO spacecraft at the north pole with the sensor aligned with the inertial reference frame (zero degree attitude error), as shown in FIG. 4.

Figure 5:
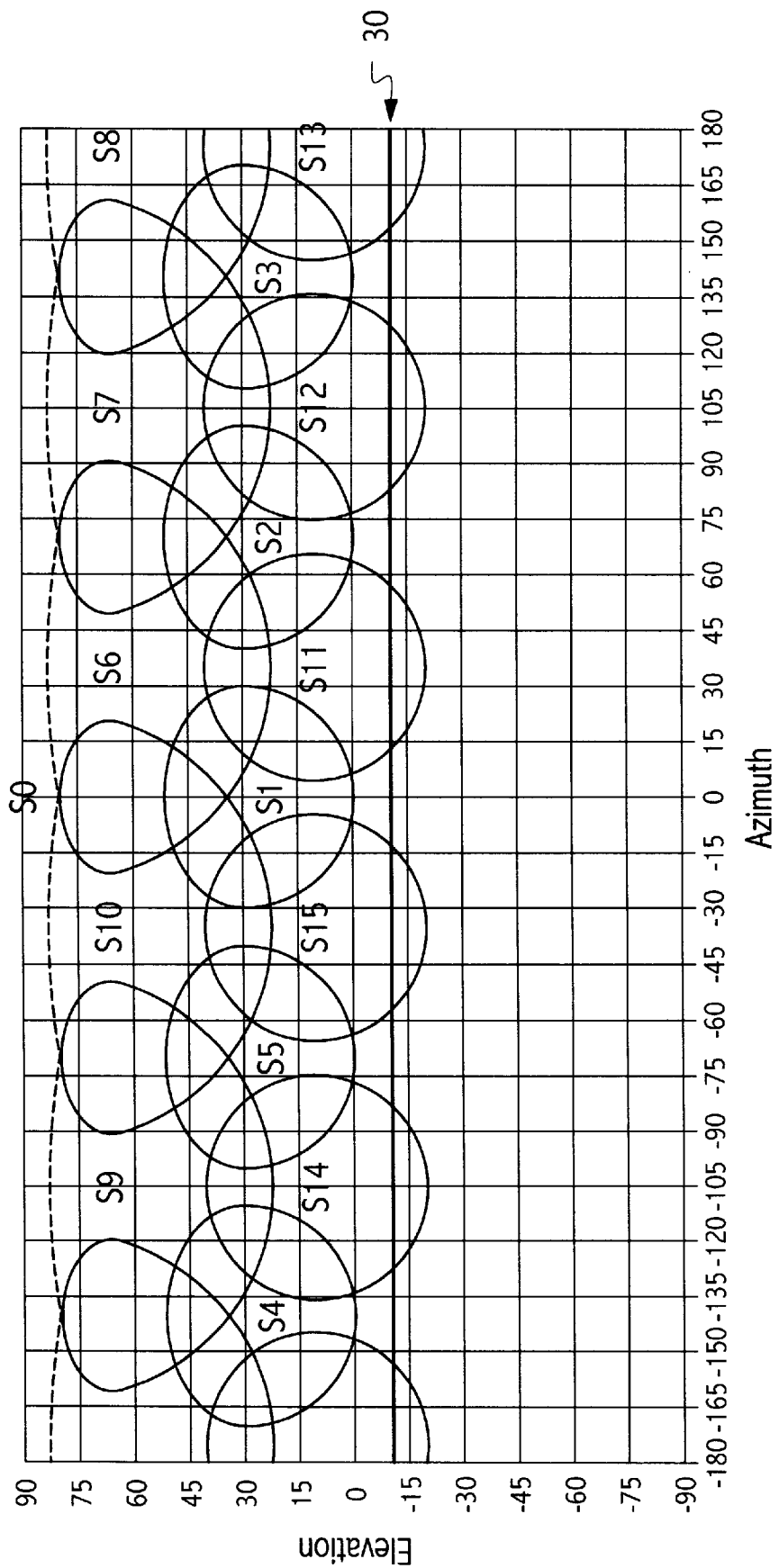
FIG. 5 is a 2-D projection of the field-of-view of the sensor of a second embodiment with increased half-cone angles.
Figure 6:
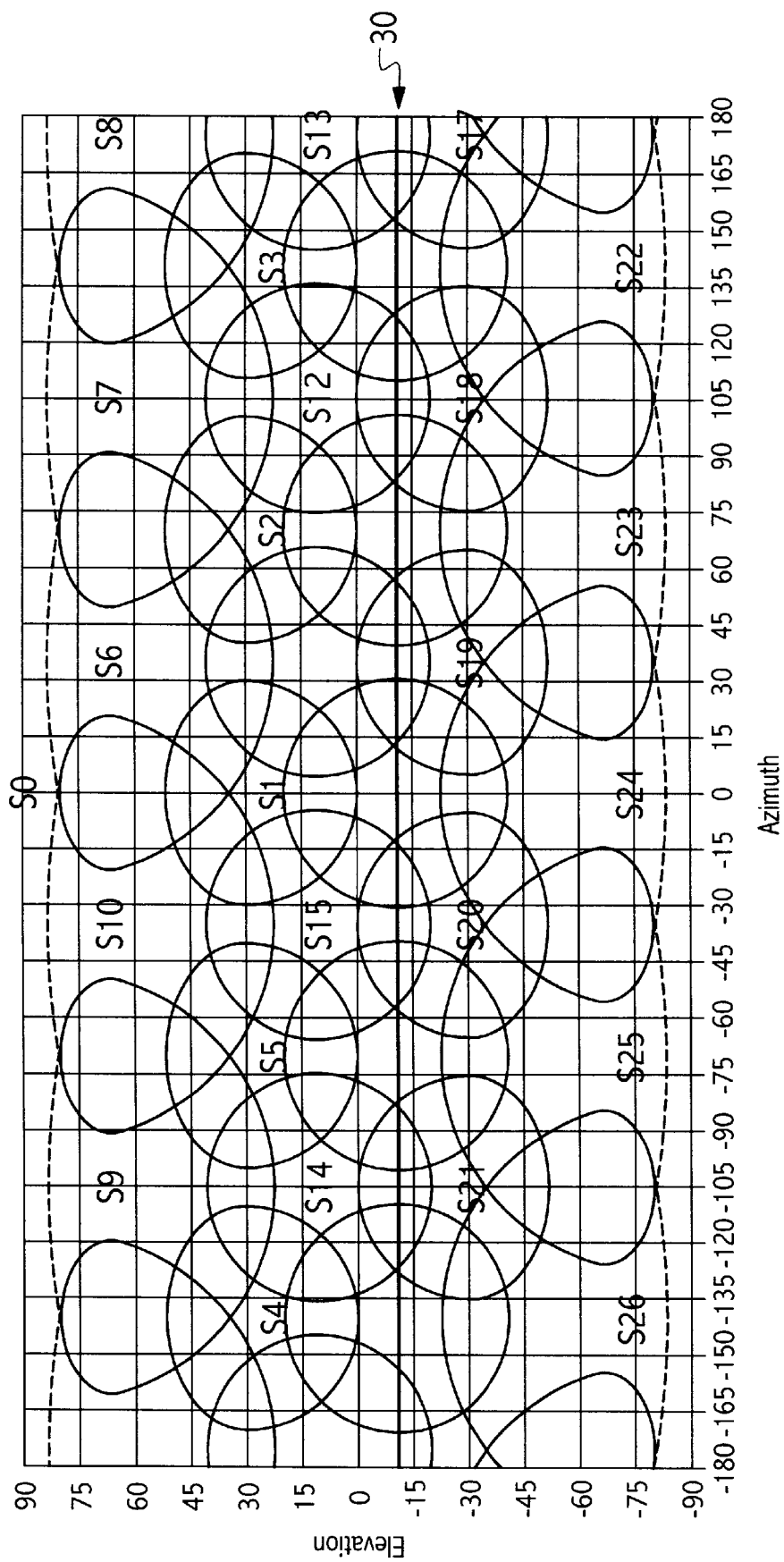
FIG. 6 is a 2-D projection of the field-of-view of the sensor of a third embodiment of the invention.

Another way to divide the sky into a greater number of smaller areas without adding more sensor elements is to enlarge reduced field-of-views (RFOVs) in the basic design to create areas of overlap, using the information provided by the resulting overlapping coverage (see FIG. 5, which has a 27% increase in the half-cone angles). The overlap regions and remaining regions now yield effective FOVs (EFOV) for the sky coverage (the RFOV and EFOV are the same when no overlap occurs). FIG. 3B shows two hemi-buckeyballs 24b and 24c oriented in opposite directions. Buckeyballs 24b and 24c, considered as a single sensor, can provide full $4\pi$ steradian coverage of the sky. This orientation involves two hemi-buckeyballs mounted to a user spacecraft (e.g., one to the zenith deck and the other to the nadir deck). Not only does this configuration provide the capability of two individual buckeyballs, but allows for the additional division of the full sky into areas where the two halves overlap. Each regions covered by an antenna 23 correspond to a face 25 of the buckeyball (of which there are 32), Regions covered by two antennas 23 correspond to the edges of the buckeyball (of which there are 90). Not surprisingly, regions covered by three antennas 23 correspond to the vertices of the buckeyball (of which there are 60). The full buckeyball divides the sky up into 182 uniquely defined areas. A planar projection of this configuration is shown in FIG. 6.

The configurations considered are summarized in Table 1 (EFOV-1 corresponds to regions covered by one element, and likewise for EFOV-2 and EFOV-3).

TABLE 1

Geometry and Configurations

| CEGANS | Geometry | Cov. | EFOV-1 | EFOV-2 | EFOV-3 | Total Areas |
|---|---|---|---|---|---|---|
| A1 | Full-Buckeyeball | $4\pi$ | 32 | 90 | 60 | 182 |
| A2 | Full-Buckeyball | $4\pi$ | 32 | 90 | 0 | 122 |
| B1 | Hemi-Buckeyball | $2\pi$ | 16 | 33 | 20 | 69 |
| B2 | Hemi-Buckeyball | $2\pi$ | 16 | 33 | 0 | 49 |
| C1 | Full-Dodecahedron | $4\pi$ | 12 | 30 | 20 | 62 |

TABLE 1-continued

Geometry and Configurations

| CEGANS | Geometry | Cov. | EFOV-1 | EFOV-2 | EFOV-3 | Total Areas |
|---|---|---|---|---|---|---|
| C2 | Full-Dodecahedron | $4\pi$ | 12 | 30 | 0 | 42 |
| D1 | Hemi-Dodecahedron | $2\pi$ | 6 | 10 | 5 | 21 |
| D2 | Hemi-Dodecahedron | $2\pi$ | 6 | 10 | 0 | 16 |

To allow easy understanding of the environment during the sensor development phase, the first set of refinement studies can be executed assuming the CEGANS are affixed to a static user spacecraft with a zero degree attitude error under a static GPS constellation. This allows for realistic yet comprehensible results to be obtained, while providing a consistent comparative basis of results. Development of increasingly complex CEGANS types followed. Once the desired level of sensor complexity has been successfully modeled, refinements in the environmental model can be addressed. Up to this point, all attitude solutions are obtained assuming the CEGANS to be affixed to a static LEO (700 km altitude) user spacecraft with a zero degree attitude error under a static GPS constellation. Moving to the next level of complexity involves setting the user spacecraft in motion about the Earth. For this step, the user spacecraft is assumed to be an Earth pointing vehicle, with no attitude errors, maintaining the CEGANS in a zenith pointing orientation as the spacecraft moves under a static constellation. A polar orbit is used to provide the widest variety of geometries with respect to the GPS constellation.

In each case the sightlines from the user spacecraft to each SV in the GPS constellation are determined, with those behind the Earth (from the user spacecraft's perspective) eliminated from subsequent consideration. The GPS SV sightlines are then compared to the boresight vectors 27 and cone angles of each sensor element to establish which GPS SVs fall within the RFOV of each sensor element. In this way, a true model can be developed while collecting the sightline data to be made available for attitude determination. This sightline data takes the form of a binary "visibility" matrix (1: SV visible, 0: SV not visible) with GPS SVs along one axis and CEGANS element along the other. Since the nominal GPS navigation function permits inertial position determination of all the GPS SVs as well as the user spacecraft, vector differences allow determination of the vector sightlines from the user spacecraft body to the GPS SVs in the inertial frame. Comparing the GPS SV sightlines to the known geometry of the various CEGANS elements in the user spacecraft body frame through the visibility matrix allows determination of a unique attitude which permits the correct GPS SVs to be "seen" by the correct CEGANS elements at a particular time.

Once the body boresight vectors 27 and spacecraft sightline vectors 28 are given, then the attitude A can be determined. This is accomplished by minimizing the following loss function (first posed by Wahba)

$$J(A) = \frac{1}{2}\sum_{i=1}^{n} w_i \|b_i - As_i\|^2 \tag{1}$$

where $b_{li}$ now denotes $i^{th}$ unit vector to the center of the EFOV, $s_i$ denotes the normalized $i^{th}$ sightline vector 28, $w_i$ is a weighting factor, A is an attitude matrix, and J(A) is the cost function for the attitude matrix A. The optimal choice of weights will be discussed below. The error introduced using the new sensor configuration is mostly due to the incorrect knowledge of the actual line-of-sight to the GPS spacecraft in the body frame, since all visible GPS spacecraft in an antenna FOV are assumed to have a body vector in the center of the EFOV. It is possible to have overlapping circles so that all EFOVs have approximately the same area. If the areas are equal for each corresponding boresight 27, then Equation (1) can be simplified by setting $w_i=1$. Once the weights have been chosen, the solution for the attitude can be found using standard techniques that minimize Wahba's equation.

A simple solution for the attitude matrix in Equation (1) is given by performing a singular-value-decomposition of the following matrix F $$F = \sum_{i=1}^{n} w_i b_i s_i^T = U\Sigma V^T \tag{2}$$

where U and V are eigenvectors of matrix F and $\Sigma$ is a singular value matrix. The optimal solution for the attitude matrix is given by $$A_{opt} = U_+ V_+^T \tag{3}$$

where $$U_+ = U[\text{diag}(1,1,\det U)] \tag{4a}$$

$$V_+ = V[\text{diag}(1,1,\det V)] \tag{4b}$$

The covariance P of the estimation error angle vector in the body frame is given by $$E\{\delta\alpha\,\delta\alpha^T\} \equiv P = \left[\sum_{i=1}^{n}(\sigma_{bi}^2 + \sigma_{si}^2)^{-1}\right]^{-1}(I - FA_{opt}^T)^{-1} \tag{5}$$

where E is an expected value, I is an identity matrix, $\delta\alpha$ corresponds to a small error angle, and $\sigma_{bi}$ and $\sigma_{si}$ are the standard deviations of the body and sightline measurement error processes, respectively. Since the GPS spacecraft positions are well known, it is reasonable to assume that $\sigma_{bi} \gg \sigma_{si}$, (hereinafter $\sigma_i^2 \ldots \sigma_{bi}^2$).

Since the z-axis of the sensor coordinate system is outward along the boresight, then the reconstructed unit vector in the body frame is given as a function of the co-elevation $\theta_i$ and azimuth $\phi_i$, given by $$\underline{b}_i = \begin{bmatrix} \sin\theta_i \cos\phi_i \\ \sin\theta_i \sin\phi_i \\ \cos\theta_i \end{bmatrix} \tag{6}$$

The true (error-free) unit vector is given by $$\underline{b}_i^{true} = \begin{bmatrix} 0 \\ 0 \\ 1 \end{bmatrix} \quad (7)$$

If the error distribution is axially symmetric about $b_i^{true}$ (which is a reasonable assumption for the GPS sensor), then the variance of the body measurement process for a uniform distribution over a circle of radius $\rho_i$ can be determined by $$\sigma_i^2 = \frac{1}{2} E\{\sin^2 \theta\} = \frac{\frac{1}{2} \int_{\rho i}^{1} (1 - \cos^2 \theta) d(\cos \theta)}{1 - \cos \rho_i} \quad (8)$$

which leads to $$\sigma_i^2 = \frac{1}{6}(2 + \cos \rho i)(1 - \cos \rho i) \quad (9)$$

Note that if $\rho_i$ is small, then the standard deviation can be accurately approximated by $\sigma_i \cup \rho_i/2$. An intuitive approach uses $w_i = 1/\rho_i^2$ to determine the optimal weights in Eq. 1. Ignoring overlap regions, the error for each antenna encompasses a small circle on a curved surface of the unit sphere. The area of a small circle $\Pi$ of angular radius $\rho$ is given by $$\Pi = 2\pi(1 - \cos \rho) \quad (10)$$

Now consider the case where the FOV of two antennas overlap. The overlap area $\Omega$ between two small circles of angular radii $\rho$ and $\varsigma$, separated by a center-to-center distance $\beta$ is given by $$\Omega = 2\pi - 2\cos\rho a \cos\left[\frac{\cos\varsigma - \cos\rho\cos\beta}{\sin\rho\sin\beta}\right] - \\ 2\cos\varsigma a \cos\left[\frac{\cos\rho - \cos\varsigma\cos\beta}{\sin\varsigma\sin\beta}\right] - 2a\cos\left[\frac{\cos\beta - \cos\varsigma\cos\rho}{\sin\varsigma\sin\rho}\right] \quad (11)$$

$$(|\rho - \varsigma| \leq \beta \leq \rho + \varsigma)$$

The overlap region can also be used to define another boresight vector. Suppose that two areas overlap, and each area has each center boresight vector given by $b_1$ and $b_2$. Then, the boresight vector of the overlap region is simply given by $$\underline{b}_3 = \frac{\underline{b}_1 + \underline{b}_2}{\|\underline{b}_1 + \underline{b}_2\|} \quad (12)$$

This allows another measurement set to be made available simply by overlapping the FOV of two antennas. Also, the non-overlapping part of antenna FOV area decreases simply by $\Pi - \Omega$. Choosing weights for the overlapping case becomes extremely difficult, since the error distribution is no longer uniform in general. Since this invention focuses on the application of the sensor and not on a purely theoretical analysis, a number of simplifications have been made. First, for the non-overlapping case, Equation (9) can be approximated by a solid angle given as the projected surface area divided by the total surface area of the sphere, so that $$\frac{1}{w_i} = \sigma_i^2 \approx \frac{2\pi(1 - \cos\rho)}{4\pi} = \frac{1}{2}(1 - \cos\rho) \quad (13)$$

Figure 7:
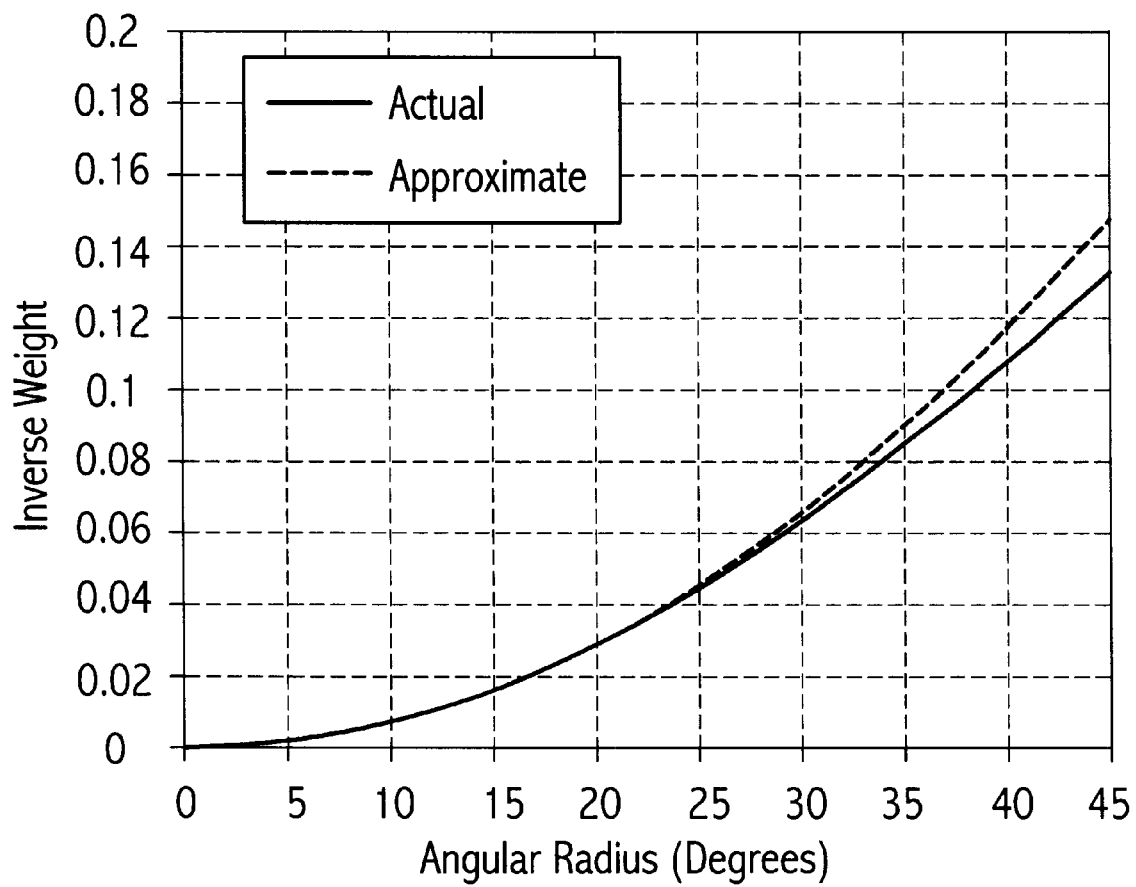
FIG. 7 is a plot of actual and approximate inverse weighting.

This is a good approximation even for large values of $\rho$ (see FIG. 7). Next, it is assumed that the same approximation holds true for the overlapping case; so that the weight for the overlapping region is given by $w_i = 4\pi/\omega_i$, and the weight for the non-overlapping region is given by $w_j = 4\pi/(\Pi_j - \omega_j)$. Therefore, as the area of the small circle decreases, more weight is placed on that measurement in the attitude determination, which intuitively makes sense. The case for triple overlaps becomes increasingly complex; however, for this study this case yields areas that are approximately equal so that Equation (13) is a good approximation for the EFOVs.

The performance of the attitude determination algorithm may be enhanced. This is accomplished by assuring that vectors formed by mapping the sightline vectors 28 into the body frame (using the determined attitude) are within the corresponding antenna FOV centered at the assumed body-frame boresight vector 27. The procedure is as follows:

1) Determine any overlap regions and corresponding boresight vectors 27.
2) Determine the optimal weights using area formulas.
3) Determine the available GPS spacecraft in each area and form sightline vectors 28.
4) Determine the attitude (A) by minimizing Equation (1).
5) Map the sightline vectors into the body frame, i.e., $\hat{b}_i = A s_i$
6) Determine the angle between the mapped vector and actual boresight $$\theta_i = a \cos(\hat{b}_i \cdot b_i)$$

7) Determine if each mapped vector $\hat{b}_i$ is outside of its corresponding FOV. If a mapped vector is not within its corresponding FOV, then the weight associated with the corresponding boresight vector 27 and sightline vector 28 should be decreased by some factor (e.g., ½). The procedure is continued until all mapped vectors are within their corresponding FOVs. This ensures that the physical nature of the determined attitude is correct.

Simulation results are presented for a number of sensor configurations. The first test case involves a simulated non-moving spacecraft at the zenith position using the hemi-dodecahedron sensor (D2 in Table 1), as seen in FIG. 2. There are nine available GPS sightlines with one overlapping SV in the S2 and S3 FOVs. With the weighting scheme developed in the previous section, it was determined that the found attitude provided mapped sightline vectors within their respected FOVs. Therefore, the attitude is consistent with the sensor configuration. Attitude accuracy and $3\sigma$ bounds using Equation (5) are shown in Table 2. Clearly the simple sensor approach provides a feasible method for attitude determination. The $3\sigma$ bounds are large due to the assumption of a uniform error distribution, which results in an absolute worst case scenario (i.e., when all actual body measurements are at the sensor edge of view).

TABLE 2

Results for Case I (see FIG. 2)

| Attitude Errors (deg) | | | 3σ bounds (deg) | | |
|---|---|---|---|---|---|
| Roll | Pitch | Yaw | Roll | Pitch | Yaw |
| 1.47 | −3.42 | −6.48 | 22.8 | 24.7 | 20.8 |

The second test case involves the same spacecraft at the zenith position using the hemi-buckeyball (B1 in Table 1), as seen in FIG. 4. For this case, there are a total of 11 available GPS sightlines, with three overlapping spacecraft. To quantify the concept of using overlapping FOVs, two different solutions were determined. The first assumes that no overlapping occurs. Results for the attitude accuracy and 3σ bounds are shown in Table 3. Clearly, decreasing the sensor FOV increases attitude accuracy (as expected). The next solution uses the overlapping regions, with an effective boresight centered in each overlapping region. Results for the attitude accuracy and 3σ bounds are also shown in Table 3. Clearly attitude knowledge improves for yaw, but more importantly the 3σ bounds are dramatically reduced. This shows that significant improvements are possible by considering the overlapping regions, with areas much less than the non-overlapping regions.

TABLE 3

Results for Case 2 (see FIG. 4)

| | Attitude Errors (deg) | | | 3σ bounds (deg) | | |
|---|---|---|---|---|---|---|
| | Roll | Pitch | Yaw | Roll | Pitch | Yaw |
| non-overlap | −1.69 | 2.98 | −1.40 | 12.9 | 13.1 | 11.8 |
| overlap | 1.60 | 2.32 | 0.81 | 4.91 | 6.3 | 4.8 |

Figure 8:
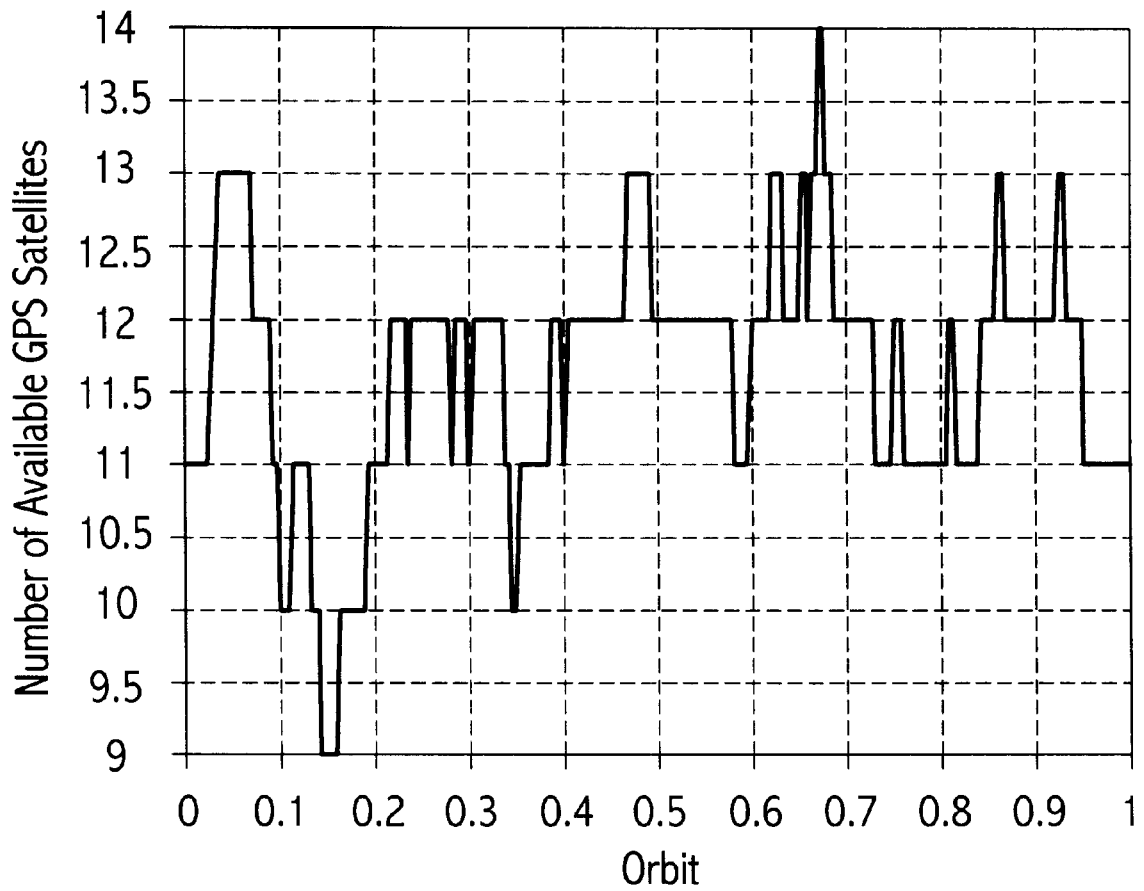
FIG. 8 is a plot of the number of available GPS sightlines.
Figure 9:
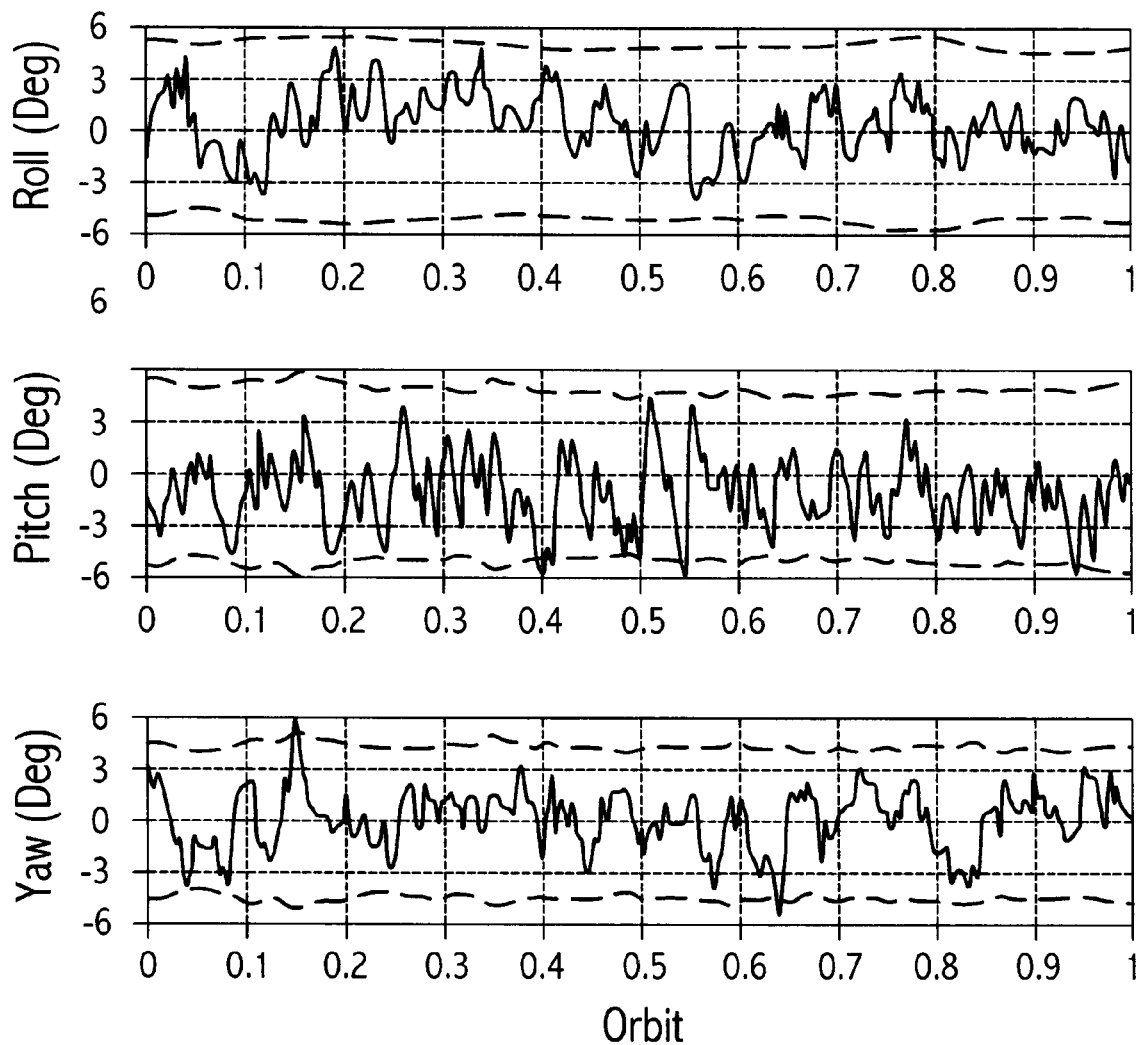
FIG. 9 is a plot of the attitude errors and 3$\sigma$ bounds.

A dynamic test run was performed for a simulated Earth pointing spacecraft at one revolution per orbit (RPO). The sensor configuration is given by the full-buckeyball (A1 in Table 1) with increased half-cone angles, as seen in FIG. 6. Increasing the half-cone angles results in approximately equal areas for the overlapping regions. The sensor measurements are sampled at 0.1 degree increments. A plot of the number of available GPS sightlines is shown in FIG. 8. In general, the more available SV's the more accurate the attitude (the separation angle affects attitude accuracy as well). A plot of the attitude errors with 3σ bounds is shown in FIG. 9. Clearly, the theoretical weighting choice in Equation (20) provides accurate attitude error bounds. Also, the attitude errors are greatest when there are the fewest available number of SV's. For this sensor configuration case attitude accuracy within 5 degrees is possible. In order to further improve the accuracy a simple attitude filter has been implemented. This is a simple first-order Kalman filter that combines a propagated model with the determined attitudes. Since gyros are not used for this case, the angular velocity is assumed to be perfect (i.e., given by the one revolution-per-orbit motion). This assumption is not exact, since external disturbances and control errors are present in the actual system. These general involve dynamic coupling in the roll/yaw axis for Earth pointing spacecraft, which are modeled by adding a bias to the pitch rate and sine wave to the roll and yaw axes with a 90 degree phase difference. The simple filter is given by $$\hat{q}_{k+1}(-) = \exp\left\{\frac{1}{2}\Omega(\omega)\Delta t\right\}\hat{q}_k(+) \quad (14a)$$

$$\hat{q}_k(+) = (1-\alpha)\hat{q}_k(-) + \alpha\tilde{q}_k \quad (14b)$$

where $\Delta t$ is the sampling interval in seconds, $\tilde{q}_k$ is the determined attitude at time $t_k$, $\hat{q}_k$ is the estimated attitude at time $t_k$, and $\alpha$ is a scalar gain. This gain can be determined by minimizing the attitude errors from the simulated runs. A value that is too small adds too much model correction, and tends to neglect measurements. A value that is too large adds too much measurement noise, and tends to neglect model corrections. A value of $\alpha=0.1$ was determined to be optimal. Also, the steady-state attitude error-covariance is given by $$\hat{P} = \frac{\alpha}{2-\alpha}P \quad (15)$$

Figure 10:
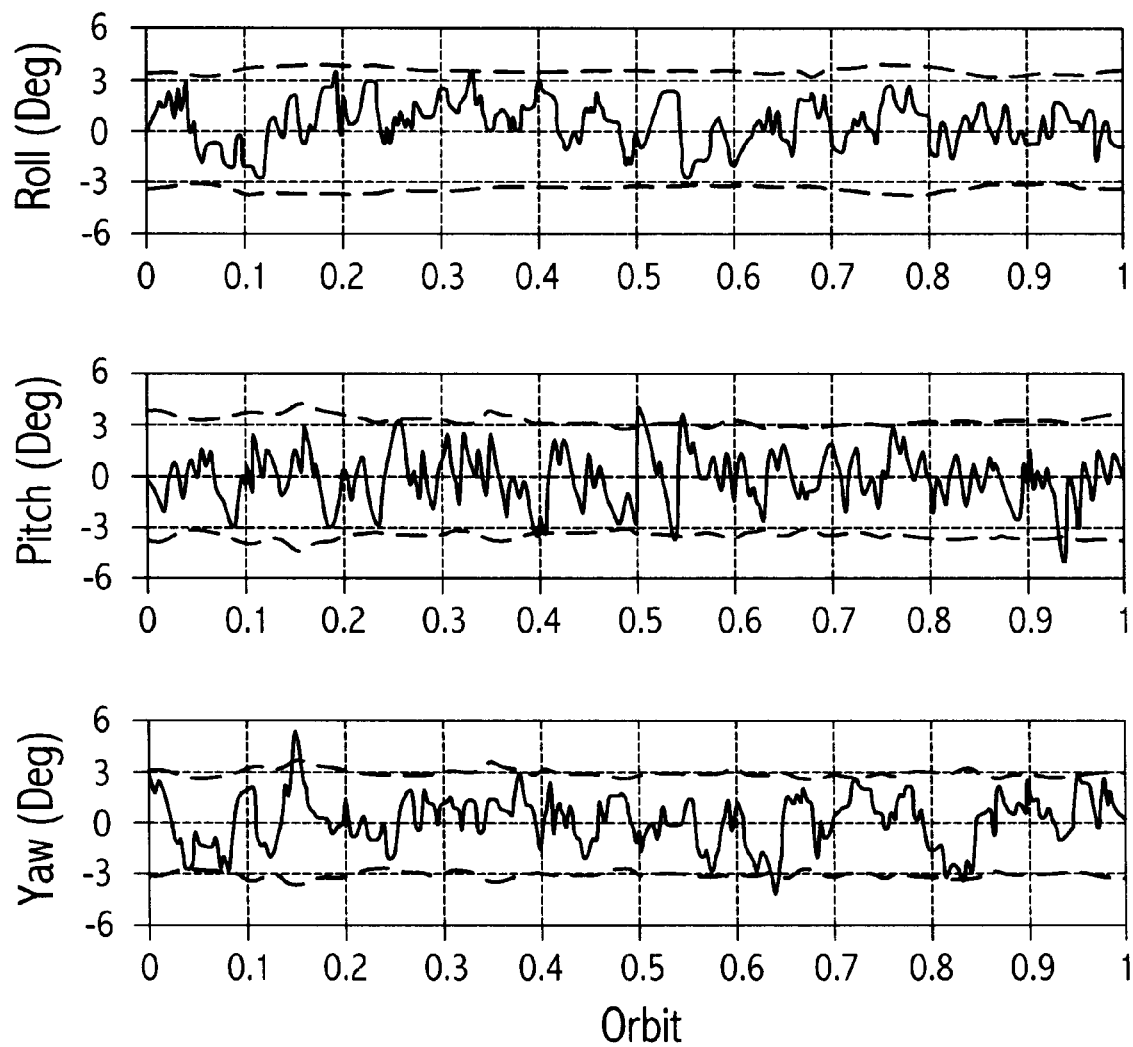
FIG. 10 is a plot of the attitude errors with 3$\sigma$ bounds using a simple filter.

A plot of the attitude errors and 3σ bounds using the simple filter is shown in FIG. 10. Clearly, the attitude accuracy can be improved by nearly a factor of four. This simulation case clearly indicates that attitude determination using the simple sensor scheme is viable.

The CEGANS concept is a viable means of providing an autonomous on-board attitude determination capability using GPS. The traditional interferometric method requires long baselines (on the order of a meter or more) to be effective, thereby limiting the size of the vehicle upon which it can be employed. Furthermore, the interferometric method can be difficult to initialize, and requires very accurate measurements of GPS SV carrier phase which can be exceedingly sensitive to multipath interference. These problems tend to impose geometric design and cumbersome testing requirements on the vehicle to provide clear, unobstructed, multipath-free sightlines to antennas distributed all over the vehicle, which depending on the vehicle may or may not be easily accommodated. Accuracies obtained herein prove that the CEGANS concept can meet the attitude requirements of a wide variety of vehicles. As technology evolves, GPS receivers and antennas become more and more capable, allowing for further refinement of this method by either better processing schemes or still greater number of antenna elements. This is in stark contrast to the potential for growth inherent in differential or carrier-phased base methods of comparable capability which are asymptotically approaching the limits imposed by physics.

Although the description above contains many specifics, these should not be construed as limiting the scope of the invention but as merely providing illustrations of some of the presently preferred embodiments of the invention. Thus, the scope of the invention should be determined by the appended claims and their legal equivalents, rather than by the examples given.

What is claimed is:

1. A method of determining the attitude of a vehicle, comprising the steps of:

a) receiving a plurality of GPS carrier signals from a plurality of GPS space vehicles into a sensor array having a plurality of antenna elements, each having a restricted field-of-view;

b) polling each antenna element of said sensor array to determine which of said GPS space vehicles are within said restricted field-of-view of each antenna element; and c) constructing and minimizing a loss function to determine said attitude.

2. The method of claim 1, wherein the accuracy of said attitude is increased using weighting factors.

3. The method of claim 1, wherein said loss function is a Wahba loss function.

4. A method of determining the navigation and attitude of a vehicle, comprising the steps of:

(a) receiving a plurality of GPS carrier signals from a plurality of GPS space vehicles using a sensor array having a plurality of antenna elements, wherein each of said plurality of antenna elements has an overlapping and restricted field-of-view; and (b) computing a navigation and attitude by determining which of said space vehicles is within said restricted field-of-view of each of said antenna elements, forming a binary visibility matrix, minimizing a loss function and enhancing said navigation and attitude using weighting factors.

5. The method of claim 4, wherein said loss function is a Wahaba loss function.

6. A method of determining the navigation and attitude of a vehicle using a plurality of GPS carrier signals from a plurality of GPS space vehicles collected by a sensor array having a plurality of antenna elements, each having a restricted field-of-view, comprising:

a) determining which of said GPS spacecraft are within said restricted field-of-views;

b) forming sightline vectors and determining optimal weighting using area formulas;

c) determining said attitude by minimizing a loss function;

d) mapping said sightline vectors into a body frame;

e) determining an angle between said mapped sightline vectors and a boresight;

f) determining whether each said mapped sightline vector is outside of its corresponding restricted field-of-view; and g) repeating the steps a) thru f) until each of said mapped sightline vectors is within its corresponding restricted field-of-view.

7. The method of claim 6, wherein said plurality of antenna elements are mounted to a convexed hemispherical mounting structure.

8. The method of claim 7, wherein said plurality of antenna elements are asymmetrically distributed over said convexed hemispherical mounting structure.

9. The method of claim 6, wherein said restricted fields-of-view are oriented such that no more than three of said fields-of view overlap.

* * * * *